US008988488B2

(12) United States Patent
Wang

(10) Patent No.: US 8,988,488 B2
(45) Date of Patent: Mar. 24, 2015

(54) STATE TRANSITION CONTROL METHOD, MULTIPOINT CONTROL SERVER, AND VIDEOCONFERENCING SYSTEM

(71) Applicant: Huawei Device Co., Ltd., Shenzhen (CN)

(72) Inventor: Haitao Wang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/136,285

(22) Filed: Dec. 20, 2013

(65) Prior Publication Data

US 2014/0104375 A1 Apr. 17, 2014

Related U.S. Application Data

(63) Continuation of application No. PCT/CN2012/077790, filed on Jun. 28, 2012.

(30) Foreign Application Priority Data

Jun. 28, 2011 (CN) .......................... 2011 1 0177505

(51) Int. Cl.
*H04N 7/15* (2006.01)
*H04L 12/18* (2006.01)
*H04L 29/06* (2006.01)

(52) U.S. Cl.
CPC ............ *H04N 7/152* (2013.01); *H04L 12/1818* (2013.01); *H04L 29/06421* (2013.01); *H04L 65/1069* (2013.01); *H04L 65/403* (2013.01)
USPC .................. 348/14.09; 348/14.08; 348/14.12

(58) Field of Classification Search
CPC ........... H04N 7/152; H04N 7/15; H04N 7/14; H04L 12/1818; H04L 65/403; H04L 65/1069; H04L 29/0621
USPC ............................ 348/14.01–14.16; 709/204; 370/260–261; 715/753
See application file for complete search history.

(56) References Cited

U.S. PATENT DOCUMENTS 5,541,639 A * 7/1996 Takatsuki et al. ............ 348/14.1
6,728,222 B1 4/2004 Ono
(Continued)

FOREIGN PATENT DOCUMENTS

CN 1152142 A 6/1997
CN 1464750 A 12/2003
(Continued)

OTHER PUBLICATIONS

Foreign Communication From a Counterpart Application, European Application No. 12804369.2, Extended European Search Report dated Aug. 28, 2014, 7 pages.
(Continued)

*Primary Examiner* — Melur Ramakrishnaiah
(74) *Attorney, Agent, or Firm* — Conley Rose, P.C.; Grant Rodolph; Nicholas K. Beaulieu

(57) ABSTRACT

Embodiments of the present invention provide a state transition control method, a multipoint control server, and a videoconferencing system. The method includes: receiving, by a multipoint control server, a conference reservation message, where the conference reservation message carries start time and end time of a reserved conference and an identity of a site centralized control device at a site participating in the reserved conference; and sending a state transition command to the site centralized control device according to the start time and the identity or according to the end time and the identity. In the embodiments of the present invention, through centralized control, in a non-conference state, external devices in a videoconferencing system enter a power-off state, and in a conference state, devices in the videoconferencing system are recovered to a normal working state, thereby improving user experience and reducing power consumption of the videoconferencing system.

13 Claims, 9 Drawing Sheets

(56) References Cited

U.S. PATENT DOCUMENTS

| | | | |
|---|---|---|---|
| 7,739,523 B2 * | 6/2010 | Kikugawa | .................... 713/300 |
| 2007/0011313 A1 | 1/2007 | Xu | |
| 2010/0169677 A1 | 7/2010 | Madhusoodanan | |
| 2012/0069133 A1 | 3/2012 | Wu | |

FOREIGN PATENT DOCUMENTS

| | | | |
|---|---|---|---|
| CN | 1595331 A | 3/2005 |
| CN | 1598775 A | 3/2005 |
| CN | 1610401 A | 4/2005 |
| CN | 1642096 A | 7/2005 |
| CN | 1642263 A | 7/2005 |
| CN | 101087398 A | 12/2007 |
| CN | 101583011 A | 11/2009 |
| CN | 101631224 A | 1/2010 |
| CN | 101729828 A | 6/2010 |
| CN | 101938624 A | 1/2011 |
| CN | 102244764 A | 11/2011 |
| JP | 10191293 A | 7/1998 |
| WO | 2006115338 A1 | 11/2006 |

OTHER PUBLICATIONS

Foreign Communication From a Counterpart Application, PCT Application No. PCT/CN2012/077790, English Translation of Written Opinion dated Oct. 18, 2012, 11 pages.

Foreign Communication From a Counterpart Application, Chinese Application no. 201110177505.1, Chinese Office Action dated Sep. 18, 2012, 12 pages.

Foreign Communication From a Related Counterpart Application, International Application No. PCT/CN2012/077790, International Search Report dated Oct. 18, 2012, 7 pages.

Foreign Communication From a Related Counterpart Application, International Application No. PCT/CN2012/077790, International Preliminary Report on Patentability, Jan. 7, 2014, 21 pages.

* cited by examiner

STATE TRANSITION CONTROL METHOD, MULTIPOINT CONTROL SERVER, AND VIDEOCONFERENCING SYSTEM

CROSS-REFERENCE TO RELATED APPLICATIONS

This application is a continuation of International Application No. PCT/CN2012/077790, filed on Jun. 28, 2012, which claims priority to Chinese Patent Application No. 201110177505.1, filed on Jun. 28, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

Embodiments of the present invention relate to the field of communications technologies, and in particular, to a state transition control method, a multipoint control server, and a videoconferencing system.

BACKGROUND

Videoconferencing is a communication manner in which a conference is held between users at two or more places by using a video output/input device and an audio output/input device and images and sound are transmitted on a real-time basis. In a videoconference, signals of a static image, a file, a fax, and the like can also be transmitted additionally at the same time. Videoconference participants can raise opinions by using a video output/input device and an audio output/input device and observe images, actions, and expressions of peer participants, and can also show real objects, drawings, files, and other photographs, or show words and drawings on a blackboard and a whiteboard, so that the participants in the conference feel as if they have a "face-to-face" talk with the peer participants. In this way, the videoconference may have the effect of a conference held at the site.

However, all parts in the conventional videoconferencing system need to be manually powered on/off by users, causing complex operations and poor user experience. In addition, after the conference ends, users often forget to power off the videoconferencing system, leading to a waste of power. Furthermore, if the videoconferencing system is always powered on, the service life of the parts in the videoconferencing system is shortened.

SUMMARY

Embodiments of the present invention provide a state transition control method, a multipoint control server, and a videoconferencing system to automatically power on/off all parts in the videoconferencing system and reduce power consumption of the videoconferencing system.

An embodiment of the present invention provides a state transition control method applied in a videoconferencing system including at least a multipoint control server, a site centralized control device at a site, and all external devices of the site controlled by the site centralized control device, where the site centralized control device is directly connected to all the external devices of the site controlled by the site centralized control device and the multipoint control server is connected to the site centralized control device through a network, where the method includes: receiving, by the multipoint control server, a conference reservation message, where the conference reservation message carries start time and end time of a reserved conference and an identity of the site centralized control device at the site participating in the reserved conference; and sending, by the multipoint control server, a state transition command to the site centralized control device according to the start time of the reserved conference and the identity of the site centralized control device at the site participating in the reserved conference or according to the end time of the reserved conference and the identity of the site centralized control device at the site participating in the reserved conference, so that the site centralized control device performs state transition control on all the external devices of the site controlled by the site centralized control device.

An embodiment of the present invention further provides a state transition control method applied in a videoconferencing system including at least a multipoint control server, a site centralized control device at a site, and all external devices of the site controlled by the site centralized control device, where the site centralized control device is directly connected to all the external devices of the site controlled by the site centralized control device and the multipoint control server is connected to the site centralized control device through a network, where the method includes: receiving, by the site centralized control device, a state transition command from the multipoint control server; and performing, by the site centralized control device according to the state transition command, state transition control on all the external devices of the site controlled by the site centralized control device.

An embodiment of the present invention further provides a multipoint control server, including: a first receiving module configured to receive a conference reservation message, where the conference reservation message carries start time and end time of a reserved conference and an identity of a site centralized control device at a site participating in the reserved conference; and a sending module configured to send a state transition command to the site centralized control device according to the start time of the reserved conference and the identity of the site centralized control device at the site participating in the reserved conference or according to the end time of the reserved conference and the identity of the site centralized control device at the site participating in the reserved conference, so that the site centralized control device performs state transition control on all the external devices of the site controlled by the site centralized control device.

An embodiment of the present invention further provides a site centralized control device, including: a second receiving module configured to receive a state transition command from a multipoint control server; and a state transition controlling module configured to perform, according to the state transition command received by the second receiving module, state transition control on all external devices of the site controlled by the site centralized control device.

An embodiment of the present invention further provides a videoconferencing system, including: a multipoint control server configured to receive a conference reservation message, where the conference reservation message carries start time and end time of a reserved conference and an identity of a site centralized control device at a site participating in the reserved conference; and send a state transition command to the site centralized control device according to the start time of the reserved conference and the identity of the site centralized control device at the site participating in the reserved conference or according to the end time of the reserved conference and the identity of the site centralized control device at the site participating in the reserved conference; and the site centralized control device configured to receive the state transition command from the multipoint control server, and perform, according to the state transition command, state transition control on all external devices of the site controlled by the site centralized control device.

According to the embodiments of the present invention, a multipoint control server sends a state transition command to a site centralized control device according to start time of a reserved conference and an identity of a site centralized control device at a site participating in the reserved conference which are carried in a conference reservation message or according to end time of a reserved conference and an identity of a site centralized control device at a site participating in the reserved conference. In this way, the site centralized control device that receives the state transition command may perform state transition control on all external devices of the site controlled by the site centralized control device. Therefore, through centralized control, in a non-conference state, external devices in a videoconferencing system enter a power-off state, and in a conference state, devices in the videoconferencing system are recovered to a normal working state, thereby improving user experience and reducing power consumption of the videoconferencing system.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention more comprehensible, the following clearly describes the technical solutions in the embodiments of the present invention with reference to the accompanying drawings in the embodiments of the present invention. The described embodiments are merely a part rather than all of the embodiments of the present invention. All other embodiments obtained by persons of ordinary skill in the art based on the embodiments of the present invention without creative efforts shall fall within the protection scope of the present invention.

A state transition control method provided in an embodiment of the present invention may be applied in a videoconferencing system. The videoconferencing system may include at least a multipoint control server, a site centralized control device at a site, and all external devices of the site controlled by the site centralized control device, where the site centralized control device is directly connected to all the external devices at the participating site that the site centralized control device belongs to and the multipoint control server is connected to the site centralized control device through a network. In addition, the foregoing videoconferencing system may further include a management console and a videoconferencing terminal in the external devices of the site controlled by the site centralized control device, where the management console may be arranged independently, and may also be integrated with the multipoint control server; the foregoing site centralized control device may be arranged independently, and may also be integrated with the videoconferencing terminal in the external devices of the site controlled by the site centralized control device. Specifically, the structure of the foregoing videoconferencing system may be shown in FIG. 12 and FIG. 13.

It should be noted that in the description of the following embodiments of the present invention, a standby state refers to a state of a device in power-saving mode, in which the device does not consume power basically and the device can be recovered to a state before entering the standby state in a short time. In the standby state, running software and open files can still maintain their original states, and power is only supplied to the memory of the device.

A normal working state refers to a state when all parts of a device are powered on.

Figure 1:
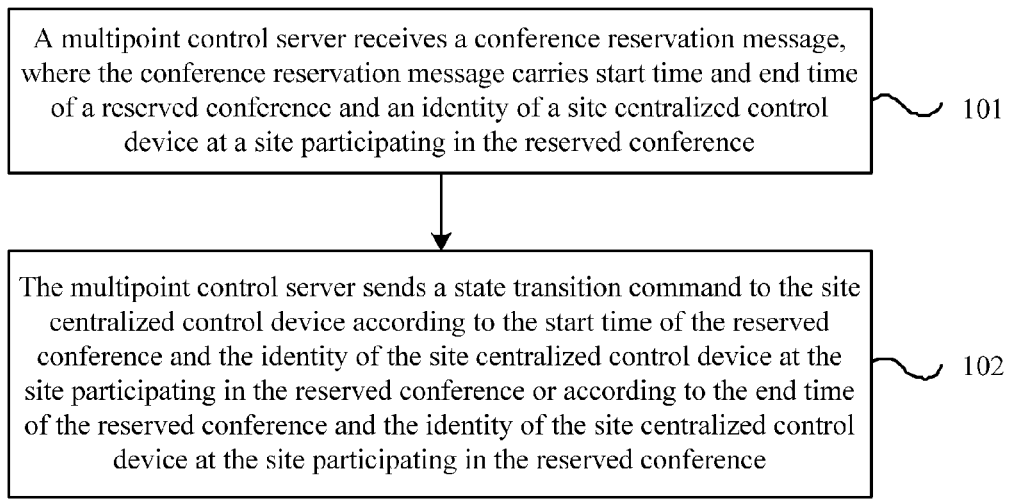
FIG. 1 is a flowchart of an embodiment of a state transition control method according to the present invention.

FIG. 1 is a flowchart of an embodiment of a state transition control method according to the present invention. As shown in FIG. 1, the state transition control method may include:

Step 101: A multipoint control server receives a conference reservation message, where the conference reservation message carries start time and end time of a reserved conference and an identity of a site centralized control device at a site participating in the reserved conference.

In the embodiment of the present invention, the identity of the site centralized control device at the site participating in the reserved conference may be represented by a character, a string and/or a number, and the like. The specific form of the identity of the site centralized control device is not limited by the embodiment of the present invention so long as the site centralized control device can be uniquely identified.

Specifically, the receiving a conference reservation message by a multipoint control server may be as follows:

The multipoint control server receives a conference reservation message sent by a management console in the videoconferencing system through a signaling channel, where the multipoint control server is connected to the management console through a network; or the multipoint control server receives a conference reservation message sent through a network by a videoconferencing terminal in external devices of the site controlled by the site centralized control device, where the multipoint control server is connected to the videoconferencing terminal through a network.

Further, in this embodiment, after receiving the conference reservation message, the multipoint control server may enter a normal working state from a standby state before the start time of the reserved conference.

In the standby state, the multipoint control server stays in power-saving mode, and can only detect a network and receive a conference reservation message; in the normal working state, all hardware of the multipoint control server is powered on completely.

Step 102: The multipoint control server sends a state transition command to the site centralized control device according to the start time of the reserved conference and the identity of the site centralized control device at the site participating in the reserved conference or according to the end time of the reserved conference and the identity of the site centralized control device at the site participating in the reserved conference, so that the site centralized control device performs state transition control on all the external devices of the site controlled by the site centralized control device.

Specifically, the multipoint control server may send a power-on command to the site centralized control device at the participating site according to the start time of the reserved conference and the identity of the site centralized control device at the site participating in the reserved conference, so that the site centralized control device performs power-on control on all the external devices of the site controlled by the site centralized control device; or the multipoint control server may send a power-off command to the site centralized control device at the participating site according to the end time of the reserved conference and the identity of the site centralized control device at the site participating in the reserved conference, so that the site centralized control device performs power-off control on all the external devices of the site controlled by the site centralized control device.

After the multipoint control server sends a power-off command to the site centralized control device at the participating site according to the end time of the reserved conference and the identity of the site centralized control device, if all site centralized control devices at sites participating in the reserved conference enter the standby state, the multipoint control server enters the standby state from the normal working state.

In this embodiment, the multipoint control server may be specifically a multipoint control unit (MCU).

In the foregoing embodiment, through centralized control, in a non-conference state, external devices in a videoconferencing system enter a power-off state, and in a conference state, devices in the videoconferencing system are recovered to a normal working state, thereby improving user experience and reducing power consumption of the videoconferencing system.

Figure 2:
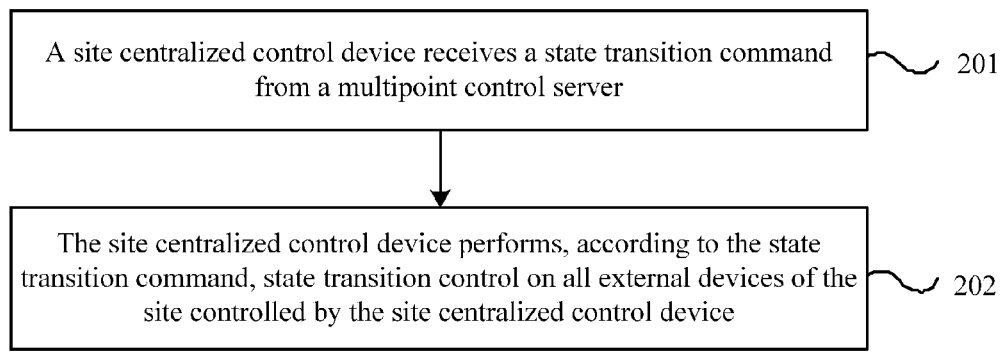
FIG. 2 is a flowchart of another embodiment of a state transition control method according to the present invention.

FIG. 2 is a flowchart of another embodiment of a state transition control method according to the present invention. As shown in FIG. 2, the state transition control method may include:

Step 201: A site centralized control device receives a state transition command from a multipoint control server.

In this embodiment, after the site centralized control device receives a state transition command from the multipoint control server, when the state transition command is a power-on command, the site centralized control device may enter a normal working state from a standby state according to the foregoing power-on command.

Step 202: The site centralized control device performs, according to the state transition command, state transition control on all external devices of a site controlled by the site centralized control device.

In one implementation of this embodiment, if the state transition command is a power-on command, the site centralized control device may perform, according to the power-on command, power-on control on all the external devices of the site controlled by the site centralized control device. Specifically, the site centralized control device may perform, according to a preset power-on sequence and a preset power-on time interval, power-on control on all the external devices of the site controlled by the site centralized control device, so that all the external devices enter the working state; or the site centralized control device may perform, according to a preset power-on sequence and a preset power-on time interval by using an external device controlling module of the site, power-on control on all the external devices of the site controlled by the site centralized control device, so that all the external devices enter the working state.

The foregoing external devices may include at least one of the following or any combination thereof: a display device, a camera, a microphone, a speaker, and a videoconferencing terminal. The power-on sequence may be set to descending order according to power of the external devices, for example, the videoconferencing terminal is first powered on, and then the display device, the camera, the microphone, and the speaker are powered on in sequence; and the power-on time interval may be set to 10 seconds. The foregoing settings are only examples. The power-on sequence and the power-on time interval of the external devices are not limited by the embodiment of the present invention, and can be set freely according to actual needs.

In another implementation of this embodiment, if the state transition command is a power-off command, the site centralized control device may perform, according to the power-off command, power-off control on all the external devices of the site controlled by the site centralized control device. Specifically, the site centralized control device may perform, according to a preset power-off sequence and a preset power-off time interval, power-off control on all the external devices of the site controlled by the site centralized control device; or the site centralized control device may perform, according to a preset power-off sequence and a preset power-off time interval by using an external device controlling module of the site, power-off control on all the external devices of the site controlled by the site centralized control device.

Similarly, the power-off sequence may be set to ascending order according to power of the external devices, for example, the speaker is first powered off, and then the microphone, the camera, the display device, and the videoconferencing terminal are powered off in sequence; and the power-off time interval may be set to 10 seconds. The foregoing settings are only examples. The power-off sequence of the external devices and the power-off time interval are not limited by the embodiment of the present invention, and can be set freely according to actual needs.

In this embodiment, after determining that all the external devices of the site controlled by the site centralized control device are powered off, the site centralized control device can enter a standby state from a normal working state.

In this embodiment, the site centralized control device may be arranged independently, and may also be integrated with the videoconferencing terminal in the external devices of the site controlled by the site centralized control device, that is, a new device may be added to the videoconferencing system to act as the site centralized control device, and the videoconferencing terminal in the external devices of the site controlled by the site centralized control device may also be used as the site centralized control device.

In the foregoing embodiment, through centralized control, in a non-conference state, external devices in a videoconferencing system enter a power-off state, and in a conference state, devices in the videoconferencing system are recovered to a normal working state, thereby improving user experience and reducing power consumption of the videoconferencing system.

The description of the following embodiments of the present invention is based on an assumption that the multipoint control server is an MCU.

Figure 3:
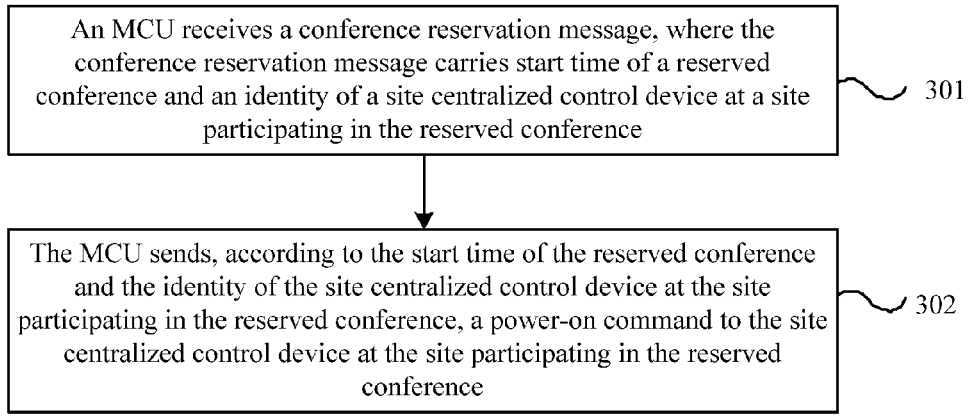
FIG. 3 is a flowchart of still another embodiment of a state transition control method according to the present invention.

FIG. 3 is a flowchart of still another embodiment of a state transition control method according to the present invention. As shown in FIG. 3, the state transition control method may include:

Step 301: An MCU receives a conference reservation message, where the conference reservation message carries start time of a reserved conference and an identity of a site centralized control device at a site participating in the reserved conference.

Specifically, the MCU may receive a conference reservation message sent by a management console in the videoconferencing system through a signaling channel, where the MCU is connected to the management console through a network; or the MCU may receive a conference reservation message sent through a network by a videoconferencing terminal in external devices of the site controlled by the site centralized control device, where the MCU is connected to the videoconferencing terminal through the network.

Further, in this embodiment, after receiving a conference reservation message, the MCU may enter a normal working state from a standby state before the start time of the reserved conference.

Step 302: The MCU sends, according to the start time of the reserved conference and the identity of the site centralized control device at the site participating in the reserved conference, a power-on command to the site centralized control device at the site participating in the reserved conference, so that the site centralized control device performs power-on control on all the external devices of the site controlled by the site centralized control device.

In the foregoing embodiment, the MCU may send, according to the start time of the reserved conference and the identity of the site centralized control device at the site participating in the reserved conference which are carried in the conference reservation message, a power-on command to the site centralized control device at the site participating in the reserved conference. In this way, the site centralized control device that receives the power-on command may perform power-on control on all external devices of the site controlled by the site centralized control device. Therefore, through centralized control, in a conference state, devices in the videoconferencing system enter a normal working state, thereby improving user experience and reducing power consumption of the videoconferencing system.

Figure 4:
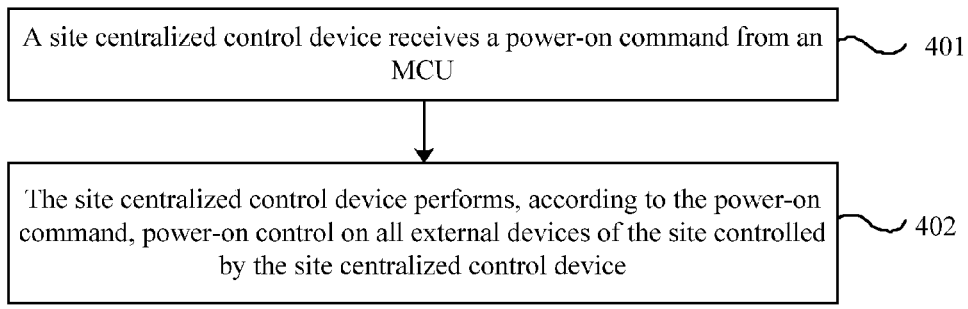
FIG. 4 is a flowchart of still another embodiment of a state transition control method according to the present invention.

FIG. 4 is a flowchart of still another embodiment of a state transition control method according to the present invention. As shown in FIG. 4, the state transition control method may include:

Step 401: A site centralized control device receives a power-on command from an MCU.

Step 402: The site centralized control device performs, according to the power-on command, power-on control on all external devices of a site controlled by the site centralized control device.

Specifically, after receiving a power-on command, the site centralized control device may enter a normal working state from a standby state according to the power-on command, and may perform, according to a preset power-on sequence and a preset power-on time interval, power-on control on all external devices of the site controlled by the site centralized control device, so that all the external devices enter the working state.

The foregoing external devices may include at least one of the following or any combination thereof: a display device, a camera, a microphone, a speaker, and a videoconferencing terminal. The power-on sequence may be set to descending order according to power of the external devices, for example, the videoconferencing terminal is first powered on, and then the display device, the camera, the microphone, and the speaker are powered on in sequence; and the power-on time interval may be set to 10 seconds. The foregoing settings are only examples. The power-on sequence and the power-on time interval of the external devices are not limited by the embodiment of the present invention, and can be set freely according to actual needs.

In addition, if the site centralized control device cannot perform power-on control on the external device independently, the site centralized control device may perform, according to a preset power-on sequence and a preset power-on time interval by using an external device controlling module of the site, power-on control on all the external devices of the site controlled by the site centralized control device, so that all the external devices enter the working state.

During the specific implementation, after receiving a power-on command, the site centralized control device may enter a normal working state from a standby state only according to the power-on command, and may also determine, according to the power-on command in combination with site detection results such as whether there are users who enter the participating site that the site centralized control device belongs to or whether there are user operations at the site, whether to enter a normal working state from a standby state. That is, after receiving a power-on command, the site centralized control device may switch itself from the standby state to the normal working state according to the power-on command; or after receiving a power-on command, the site centralized control device may first detect whether there are users who enter the participating site that the site centralized control device belongs to, and after detecting that there are users who enter the participating site that the site centralized control device belongs to, the site centralized control device switches itself from the standby state to the normal working state. Specifically, the site centralized control device may perform detection by means of infrared, sound control, temperature control, and so on to get site detection results such as whether there are users at the site controlled by the site centralized control device or whether there are user operations at the site.

In the foregoing embodiment, the site centralized control device may receive a power-on command from an MCU, and perform, according to the power-on command, power-on control on all external devices of the site controlled by the site centralized control device. In this way, through centralized control, in a conference state, devices in the videoconferencing system enter a normal working state, thereby improving user experience and reducing power consumption of the videoconferencing system.

Figure 5:
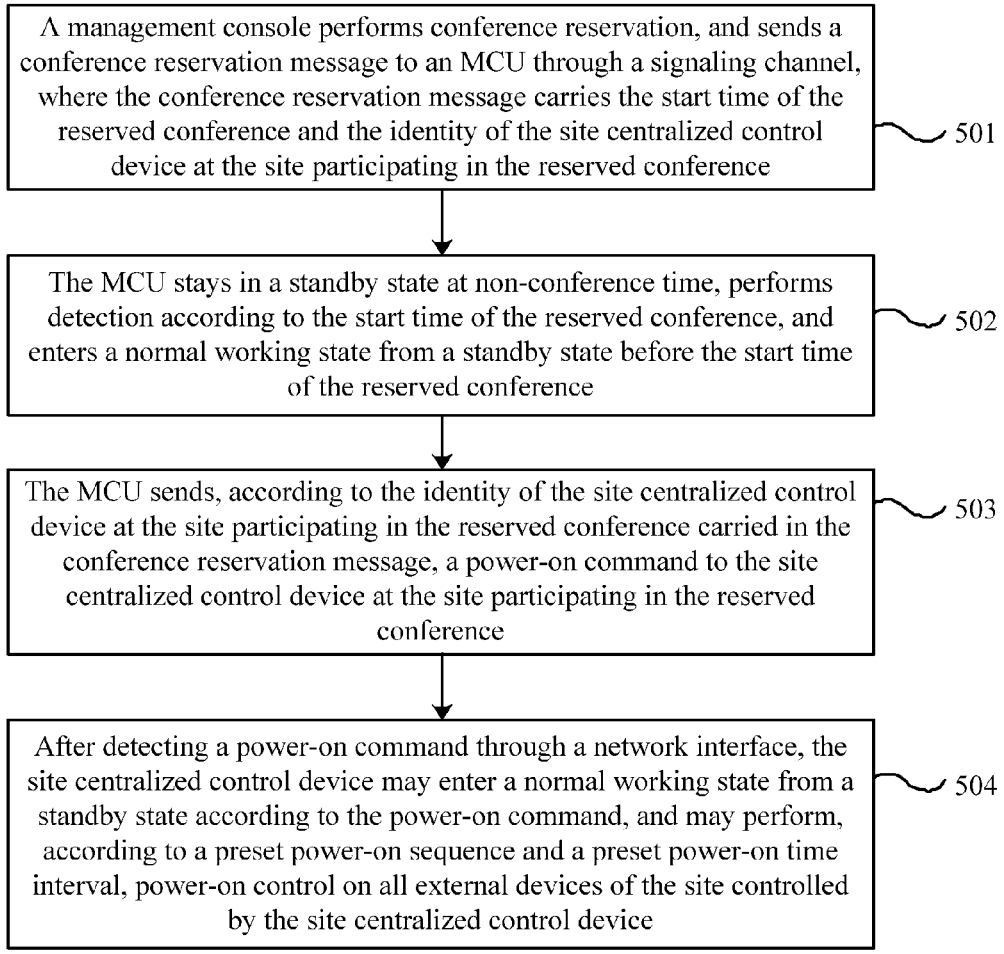
FIG. 5 is a flowchart of still another embodiment of a state transition control method according to the present invention.

FIG. 5 is a flowchart of still another embodiment of a state transition control method according to the present invention. As shown in FIG. 5, the state transition control method may include:

Step 501: A management console performs conference reservation, sets start time of a reserved conference and an identity of a site centralized control device at a site participating in the reserved conference, and then sends a conference reservation message to an MCU through a signaling channel, where the conference reservation message carries the start time of the reserved conference and the identity of the site centralized control device at the site participating in the reserved conference.

Step 502: The MCU stays in a standby state at non-conference times, performs detection according to the start time of the reserved conference, and enters a normal working state from a standby state before the start time of the reserved conference.

Specifically, the MCU may be set to enter a normal working state from a standby state N minutes before the start time of the reserved conference, where N may be set by users.

Step 503: The MCU sends, according to the identity of the site centralized control device at the site participating in the reserved conference carried in the conference reservation message, a power-on command to the site centralized control device at the site participating in the reserved conference.

Specifically, the MCU may send a power-on command to site centralized control devices at each participating site through a network, for example, an Internet Protocol (IP) network, an E1 network, an integrated services digital network (ISDN), or a packet switched data network (PSDN). Of course, with the development of technologies, other types of networks may also be included, which are not limited in the embodiment of the present invention. The "network" mentioned in all embodiments of the present invention have similar meanings.

Step 504: After detecting a power-on command through a network interface, the site centralized control device may enter a normal working state from a standby state according to the power-on command, and may perform, according to a preset power-on sequence and a preset power-on time interval, power-on control on all external devices of the site controlled by the site centralized control device, so that all the external devices enter the working state.

Specifically, for the setting of the power-on sequence and the power-on time interval, reference may be made to the description of the embodiment illustrated in FIG. 2, which is not further described herein.

In addition, if the site centralized control device cannot perform power-on control on the external devices independently, the site centralized control device may perform, according to a preset power-on sequence and a preset power-on time interval by using an external device controlling module of the site, power-on control on all the external devices of the site controlled by the site centralized control device, so that all the external devices enter the working state.

After all site centralized control devices and external devices at participating sites participating in the reserved conference enter the working state, the conference can be normally held.

In the foregoing embodiment, through centralized control, in a conference state, devices in the videoconferencing system enter a normal working state, thereby improving user experience and reducing power consumption of the videoconferencing system.

The embodiment illustrated in FIG. 5 is based on an assumption that the management console in the videoconferencing system sends a conference reservation message to the MCU through a signaling channel, but the embodiment of the present invention is not limited thereto. The videoconferencing terminal in the external devices of the site controlled by the site centralized control device may also perform conference reservation by using a remote controller or a Web, and then send the start time of the reserved conference and the identity of the site centralized control device of the site participating in the reserved conference to the MCU through a network. Subsequent processes are the same as step 502 to step 504, which are not further described herein.

Figure 6:
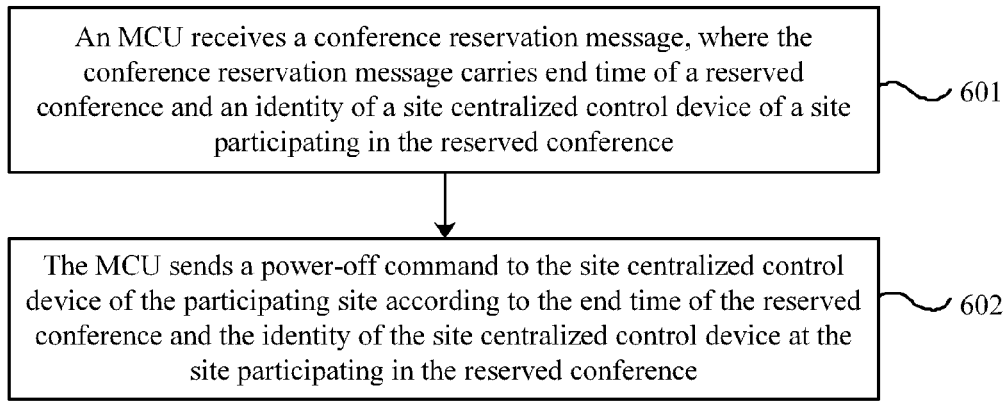
FIG. 6 is a flowchart of still another embodiment of a state transition control method according to the present invention.

FIG. 6 is a flowchart of still another embodiment of a state transition control method according to the present invention. As shown in FIG. 6, the state transition control method may include:

Step 601: An MCU receives a conference reservation message, where the conference reservation message carries end time of a reserved conference and an identity of a site centralized control device at a site participating in the reserved conference.

Specifically, the MCU may receive a conference reservation message sent by a management console in a videoconferencing system through a signaling channel; or the MCU may receive a conference reservation message sent through a network by a videoconferencing terminal in external devices of the site controlled by the site centralized control device.

Step 602: The MCU sends a power-off command to the site centralized control device at the participating site according to the end time of the reserved conference and the identity of the site centralized control device at the site participating in the reserved conference, so that the site centralized control device performs power-off control on all external devices of the site controlled by the site centralized control device.

In this embodiment, after receiving a power-off command from the MCU, the site centralized control device performs power-off control on all the external devices of the site controlled by the site centralized control device; after all the external devices of the site controlled by the site centralized control device are powered off, the site centralized control device enters a standby state; after all site centralized control devices at sites participating in the reserved conference enter the standby state, the MCU enters a standby state from a normal working state.

In the foregoing embodiment, the MCU sends, according to the end time of the reserved conference and the identity of the site centralized control device at the site participating in the reserved conference which are carried in the conference reservation message, a power-off command to the site centralized control device at the site participating in the reserved conference. In this way, the site centralized control device that receives the power-off command may perform power-off control on all the external devices of the site controlled by the site centralized control device. Therefore, through centralized control, in a non-conference state, devices in the videoconferencing system enter a power-off state, thereby improving user experience and reducing power consumption of the videoconferencing system.

Figure 7:
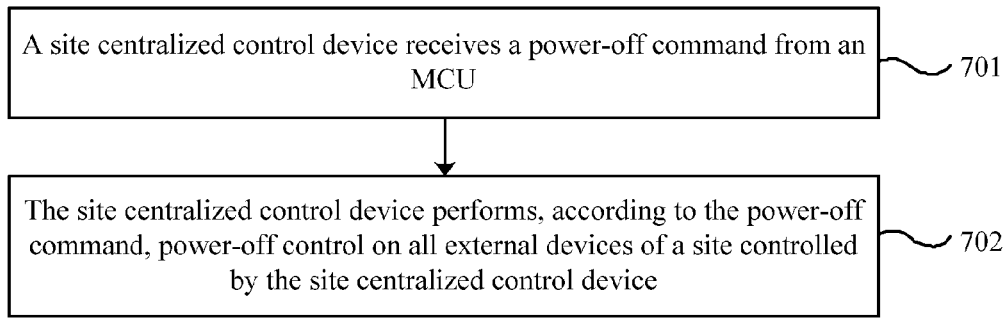
FIG. 7 is a flowchart of still another embodiment of a state transition control method according to the present invention.

FIG. 7 is a flowchart of still another embodiment of a state transition control method according to the present invention. As shown in FIG. 7, the state transition control method may include:

Step 701: A site centralized control device receives a power-off command from an MCU.

Step 702: The site centralized control device performs, according to the power-off command, power-off control on all external devices of a site controlled by the site centralized control device.

Specifically, the site centralized control device may perform, according to a preset power-off sequence and a preset power-off time interval, power-off control on all the external devices of the site controlled by the site centralized control device.

The foregoing external devices may include at least one of the following or any combination thereof: a display device, a camera, a microphone, a speaker, and a videoconferencing terminal. The power-off sequence may be set to ascending order according to power of the external devices, for example, the speaker is first powered off, and then the microphone, the camera, the display device, and the videoconferencing terminal are powered off in sequence; and the power-off time interval may be set to 10 seconds. The foregoing settings are only examples. The power-off sequence of the external devices and the power-off time interval are not limited by the embodiment of the present invention, and can be set freely according to actual needs.

In addition, if the site centralized control device cannot independently perform power-off control on all the external devices of the site controlled by the site centralized control device, the site centralized control device may perform, according to the preset power-off sequence and the preset power-off time interval by using an external device controlling module of the site, power-off control on all the external devices of the site controlled by the site centralized control device.

During the specific implementation, after receiving a power-off command, the site centralized control device may perform, only according to the power-off command, power-off control on all the external devices of the site controlled by the site centralized control device; or the site centralized control device may perform, according to the power-off command in combination with site detection results such as whether there are users at the site controlled by the site centralized control device or whether there are user operations at the site, power-off control on all the external devices of the site controlled by the site centralized control device. That is, after receiving a power-off command, the site centralized control device may perform, according to the power-off command, power-off control on all the external devices of the site controlled by the site centralized control device; or after receiving a power-off command, the site centralized control device may first detect whether there are users at the site controlled by the site centralized control device, and after detecting that there are no users at the site, the site centralized control device performs power-off control on all the external devices of the site controlled by the site centralized control device. Specifically, the site centralized control device may perform detection by means of infrared, sound control, temperature control, and so on to get site detection results such as whether there are users at the site controlled by the site centralized control device or whether there are user operations at the site.

In addition, before performing power-off control on all the external devices of the site controlled by the site centralized control device, the site centralized control device may first send a power-off prompt to users of the site controlled by the site centralized control device; after receiving a power-off confirmation from the users or failing to receive a power-off confirmation from the users within a preset period (for example, five minutes), the site centralized control device performs a step of performing power-off control on all the external devices of the site controlled by the site centralized control device.

Further, after determining that all the external devices of the site controlled by the site centralized control device are powered off, the site centralized control device enters a standby state from a normal working state.

In the foregoing embodiment, the MCU sends, according to the end time of the reserved conference and the identity of the site centralized control device at the site participating in the reserved conference which are carried in the conference reservation message, a power-off command to the site centralized control device at the site participating in the reserved conference. In this way, the site centralized control device that receives the power-off command may perform power-off control on all external devices of the site controlled by the site centralized control device. Therefore, through centralized control, in a non-conference state, devices in the videoconferencing system enter a power-off state, thereby improving user experience and reducing power consumption of the videoconferencing system.

Figure 8:
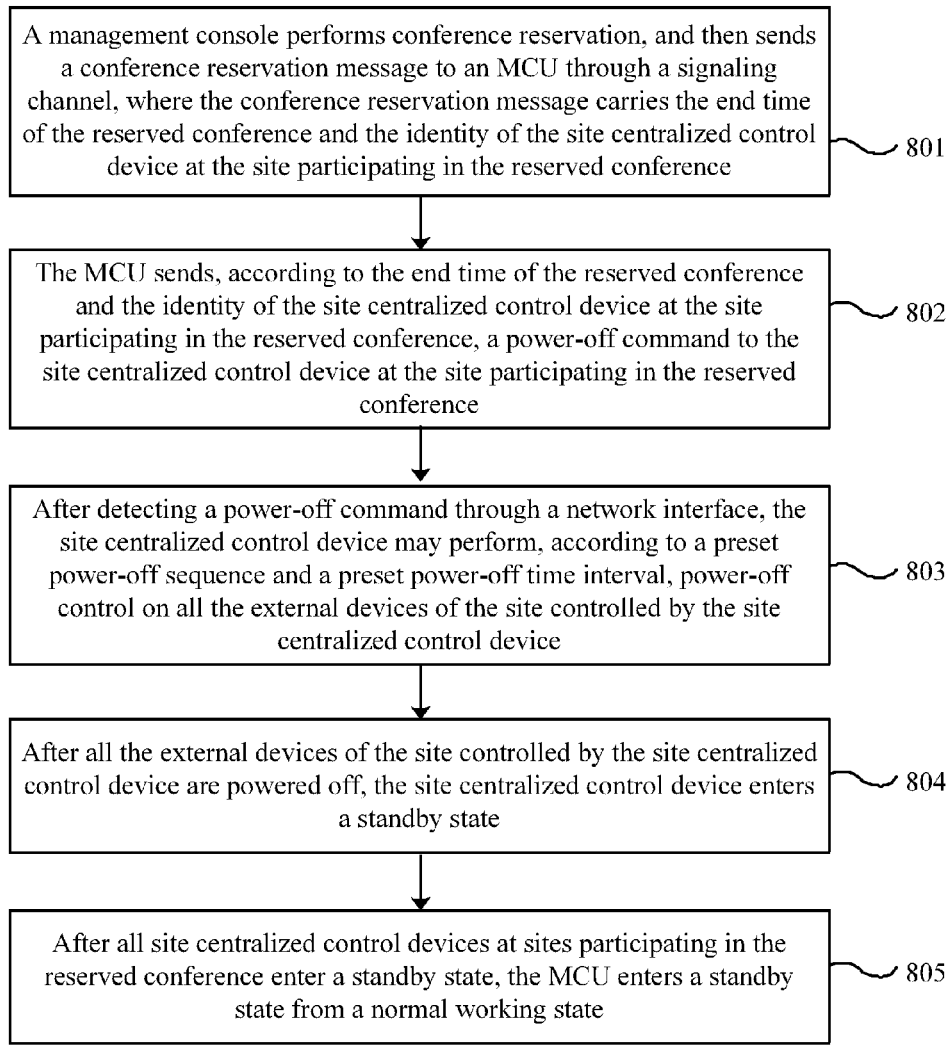
FIG. 8 is a flowchart of still another embodiment of a state transition control method according to the present invention.

FIG. 8 is a flowchart of still another embodiment of a state transition control method according to the present invention. As shown in FIG. 8, the state transition control method may include:

Step 801: A management console performs conference reservation, sets end time of a reserved conference and an identity of a site centralized control device at a site participating in the reserved conference, and then sends a conference reservation message to an MCU through a signaling channel, where the conference reservation message carries the end time of the reserved conference and the identity of the site centralized control device at the site participating in the reserved conference.

Step 802: The MCU sends, according to the end time of the reserved conference and the identity of the site centralized control device at the site participating in the reserved conference, a power-off command to the site centralized control device at the site participating in the reserved conference.

Specifically, the MCU may send a power-off command to each participating site of the reserved conference N minutes before or after the end time of the reserved conference, where N may be set by users.

Step 803: After detecting a power-off command through a network interface, the site centralized control device may perform, according to a preset power-off sequence and a preset power-off time interval, power-off control on all the external devices of the site controlled by the site centralized control device.

Specifically, for the setting of the power-off sequence and the power-off time interval, reference may be made to the description of the embodiment illustrated in FIG. 2, which is not further described herein.

In addition, if the site centralized control device cannot independently perform power-off control on all the external devices of the site controlled by the site centralized control device, the site centralized control device may perform, according to the preset power-off sequence and the preset power-off time interval by using an external device controlling module of the site, power-off control on all the external devices of the site controlled by the site centralized control device.

During the specific implementation, after receiving a power-off command, the site centralized control device may perform, only according to the power-off command, power-off control on all the external devices of the site controlled by the site centralized control device; or may perform, according to the power-off command in combination with site detection results such as whether there are users at the site controlled by the site centralized control device or whether there are user operations at the site, power-off control on all the external devices of the site controlled by the site centralized control device. That is, after receiving a power-off command, the site centralized control device may perform, according to the power-off command, power-off control on all the external devices of the site controlled by the site centralized control device; or after receiving a power-off command, the site centralized control device may first detect whether there are users at the site controlled by the site centralized control device, and after detecting that there are no users at the site, perform power-off control on all the external devices of the site controlled by the site centralized control device. Specifically, the site centralized control device may perform detection by means of infrared, sound control, temperature control, and so on to get site detection results such as whether there are users at the site controlled by the site centralized control device or whether there are user operations at the site.

In this embodiment, before performing power-off control on all the external devices of the site controlled by the site centralized control device, the site centralized control device may first send a power-off prompt to users, for example, by using a display device, it prompts users whether to end the conference and power off devices automatically; after receiving a power-off confirmation from the users, the site centralized control device performs a step of performing power-off control on all the external devices of the site controlled by the site centralized control device. After sending a power-off prompt to the users, if the site centralized control device fails to receive a power-off confirmation from the users within a preset period (for example, five minutes), the site centralized control device may perform, according to default settings, forced power-off control on all the external devices of the site controlled by the site centralized control device.

Step 804: After all the external devices of the site controlled by the site centralized control device are powered off, the site centralized control device enters a standby state.

Step 805: After all site centralized control devices at sites participating in the reserved conference enter a standby state, the MCU enters a standby state from a normal working state.

In the foregoing embodiment, through centralized control, in a non-conference state, devices in the videoconferencing system enter a power-off state, thereby improving user experience and reducing power consumption of the videoconferencing system.

The embodiment illustrated in FIG. 8 is based on an assumption that the management console in the videoconferencing system sends a conference reservation message to the MCU through a signaling channel, but the embodiment of the present invention is not limited thereto. The videoconferencing terminal in the external devices of the site controlled by the site centralized control device may also perform conference reservation by using a remote controller or a Web, and then send the end time of the reserved conference and the identity of the site centralized control device of the site participating in the reserved conference to the MCU through a network. Subsequent processes are the same as step 802 to step 805, which are not further described herein.

Persons of ordinary skill in the art may understand that all or a part of the steps of the method according to the embodiments may be implemented by a program instructing relevant hardware. The program may be stored in a computer readable storage medium. When the program runs, the steps of the method according to the embodiments are performed. The storage medium may be any medium that can store program codes, such as a read-only memory (ROM), a random-access memory (RAM), a magnetic disk, or a compact disc read-only memory (CD-ROM).

Figure 9:
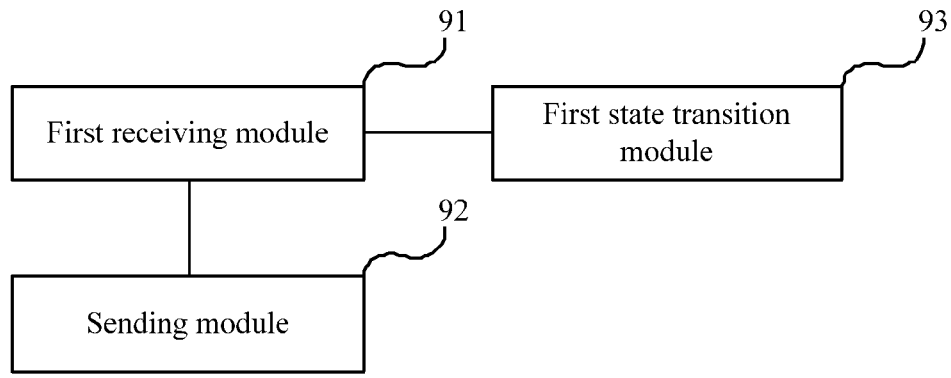
FIG. 9 is a schematic structural diagram of an embodiment of a multipoint control server according to the present invention.

FIG. 9 is a schematic structural diagram of an embodiment of a multipoint control server according to the present invention. The multipoint control server in this embodiment can implement the flowcharts of the embodiments illustrated in FIG. 1, FIG. 3, and FIG. 6. As shown in FIG. 9, the multipoint control server may include: a first receiving module 91 configured to receive a conference reservation message, where the conference reservation message carries start time and end time of a reserved conference and an identity of a site centralized control device at a site participating in the reserved conference.

Specifically, the first receiving module 91 may receive a conference reservation message sent by a management console in a videoconferencing system through a signaling channel, where the multipoint control server is connected to the management console through a network; or receive a conference reservation message sent through a network by a videoconferencing terminal in external devices of a site controlled by the site centralized control device, where the multipoint control server is connected to the videoconferencing terminal through the network.

A sending module 92 is configured to send a state transition command to the site centralized control device according to the start time of the reserved conference and the identity of the site centralized control device at the site participating in the reserved conference or according to the end time of the reserved conference and the identity of the site centralized control device at the site participating in the reserved conference, so that the site centralized control device performs state transition control on all the external devices of the site controlled by the site centralized control device.

Specifically, the sending module 92 may send, according to the start time of the reserved conference and the identity of the site centralized control device at the site participating in the reserved conference, a power-on command to the site centralized control device at the site participating in the reserved conference, so that the site centralized control device performs power-on control on all external devices of the site controlled by the site centralized control device; or send, according to the end time of the reserved conference and the identity of the site centralized control device at the site participating in the reserved conference, a power-off command to the site centralized control device at the site participating in the reserved conference, so that the site centralized control device performs power-off control on all the external devices of the site controlled by the site centralized control device.

Further, in one implementation of this embodiment, the multipoint control server may further include: a first state transition module 93 configured to switch the multipoint control server from a standby state to a normal working state after the first receiving module 91 receives the conference reservation message and before the start time of the reserved conference; and switch the multipoint control server from a normal working state to a standby state after all site centralized control devices at sites participating in the reserved conference enter a standby state.

In this embodiment, the multipoint control server may be an MCU.

In the foregoing multipoint control server, the sending module 92 may send, according to start time and end time of the reserved conference and the identity of the site centralized control device at the site participating in the reserved conference which are carried in the conference reservation message, a power-on/power-off command to the site centralized control device at the site participating in the reserved conference. In this way, the site centralized control device that receives the power-on/power-off command may perform power-on/power-off control on all external devices of the site controlled by the site centralized control device. Therefore, through centralized control, in a non-conference state, devices in the videoconferencing system enter a power-off state, and in a conference state, devices in the videoconferencing system are recovered to a normal working state, thereby improving user experience and reducing power consumption of the videoconferencing system.

Figure 10:
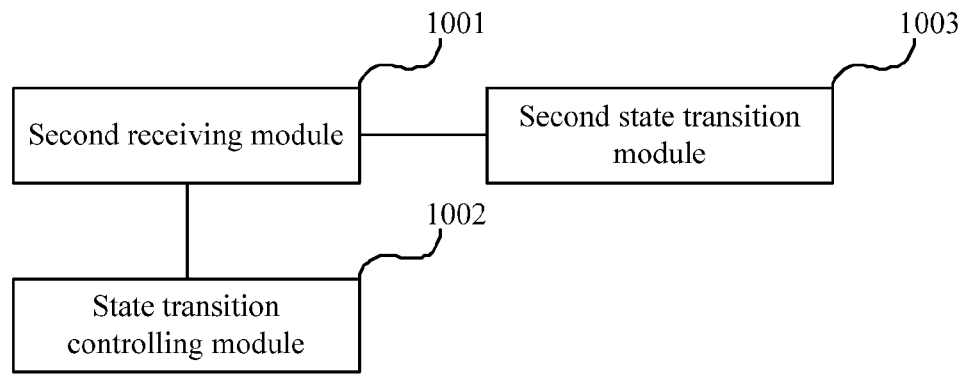
FIG. 10 is a schematic structural diagram of an embodiment of a site centralized control device according to the present invention.

FIG. 10 is a schematic structural diagram of an embodiment of a site centralized control device according to the present invention. The site centralized control device in this embodiment can implement the process of the embodiment illustrated in FIG. 2, FIG. 4 or FIG. 7. As shown in FIG. 10, the site centralized control device may include: a second receiving module 1001 configured to receive a state transition command from a multipoint control server; and a state transition controlling module 1002 configured to perform, according to the state transition command received by the second receiving module 1001, state transition control on all external devices of a site controlled by the site centralized control device.

Specifically, when the state transition command is a power-on command, the state transition controlling module 1002 may perform, according to the power-on command, power-on control on all external devices of the site controlled by the site centralized control device; or, when the state transition command is a power-off command, the state transition controlling module 1002 may perform, according to the power-off command, power-off control on all external devices of the site controlled by the site centralized control device.

The external devices provided in this embodiment may include at least one of the following or any combination thereof: a display device, a camera, a microphone, a speaker, and a videoconferencing terminal.

In one implementation of this embodiment, the state transition controlling module 1002 may perform, according to a preset power-on sequence and a preset power-on time interval, power-on control on all external devices of the site controlled by the site centralized control device, so that all the external devices enter the working state; or the site centralized control device may perform, according to a preset power-on sequence and a preset power-on time interval by using an external device controlling module of the site, power-on control on all external devices of the site controlled by the site centralized control device, so that all the external devices enter the working state.

The power-on sequence may be set to descending order according to power of the external devices, for example, the videoconferencing terminal is first powered on, and then the display device, the camera, the microphone, and the speaker are powered on in sequence; and the power-on time interval may be set to 10 seconds. The foregoing settings are only examples. The power-on sequence and the power-on time interval of the external devices are not limited by the embodiment of the present invention, and can be set freely according to actual needs.

In another implementation of this embodiment, the state transition controlling module 1002 may perform, according to a preset power-off sequence and a preset power-off time interval, power-off control on all external devices of the site controlled by the site centralized control device; or the site centralized control device may perform, according to a preset power-off sequence and a preset power-off time interval by using an external device controlling module of the site, power-off control on all external devices of the site controlled by the site centralized control device.

Similarly, the power-off sequence may be set to ascending order according to power of the external devices, for example, the speaker is first powered off, and then the microphone, the camera, the display device, and the videoconferencing terminal are powered off in sequence; and the power-off time interval may be set to 10 seconds. The foregoing settings are only examples. The power-off sequence of the external devices and the power-off time interval are not limited by the embodiment of the present invention, and can be set freely according to actual needs.

Further, in this embodiment, the site centralized control device may further include: a second state transition module 1003 configured to: when the state transition command received by the second receiving module 1001 is a power-on command, switch the site centralized control device from a standby state to a normal working state according to the power-on command; and after it is determined that all the external devices of the site controlled by the site centralized control device are powered off, switch the site centralized control device from a normal working state to a standby state.

In this embodiment, the site centralized control device may be arranged independently, and may also be integrated with the videoconferencing terminal in the external devices of the site controlled by the site centralized control device, that is, a new device may be added to the videoconferencing system to act as the site centralized control device, and the videoconferencing terminal in the external devices of the site controlled by the site centralized control device may also be used as the site centralized control device.

The foregoing site centralized control devices may switch, through centralized control, in a non-conference state, devices in the videoconferencing system to a power-off state, and in a conference state, recover devices in the videoconferencing system to a normal working state, thereby improving user experience and reducing power consumption of the videoconferencing system.

Figure 11:
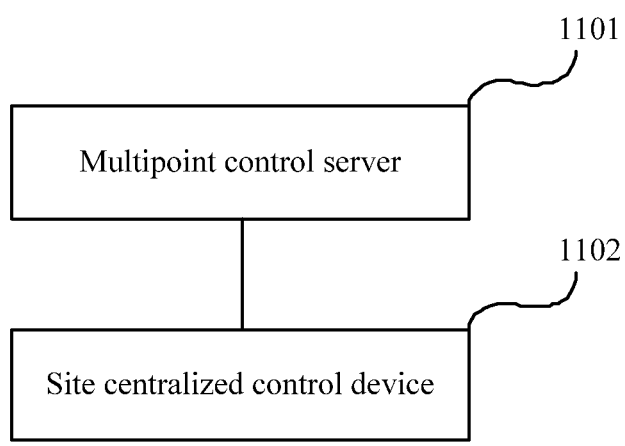
FIG. 11 is a schematic structural diagram of an embodiment of a videoconferencing system according to the present invention.

FIG. 11 is a schematic structural diagram of an embodiment of a videoconferencing system according to the present invention. As shown in FIG. 11, the videoconferencing system may include: a multipoint control server 1101 configured to receive a conference reservation message, where the conference reservation message carries start time and end time of a reserved conference and an identity of a site centralized control device at a site participating in the reserved conference; and send a state transition command to the site centralized control device according to the start time of the reserved conference and the identity of the site centralized control device at the site participating in the reserved conference or according to the end time of the reserved conference and the identity of the site centralized control device at the site participating in the reserved conference. Specifically, the multipoint control server 1101 is mainly configured to switch or mix video and audio data of multiple videoconferencing terminals according to commands of a management console; and perform processing such as video and audio coding, continuous presence, and audio mixing according to specific networks and specific protocols. The multipoint control server is a center part of the videoconferencing system. The multipoint control server 1101 can be implemented by using the multipoint control server of the embodiment illustrated in FIG. 9. The description of the following embodiments of the present invention is based on an assumption that the multipoint control server 1101 is an MCU.

A site centralized control device 1102 is configured to receive the state transition command from the multipoint control server 1101, and perform, according to the state transition command, state transition control on all external devices of the site controlled by the site centralized control device 1102. Specifically, the site centralized control device 1102 may be integrated into a videoconferencing terminal in the external devices of the site controlled by the site centralized control device 1102, and may also be an independent control device. The implementation of the site centralized control device 1102 is not limited in this embodiment. The site centralized control device 1102 can be implemented by using the site centralized control device of the embodiment illustrated in FIG. 10.

The foregoing conferencing system may switch, through centralized control, in a non-conference state, devices in the videoconferencing system to a power-off state, and in a conference state, recover devices in the videoconferencing system to a normal working state, thereby improving user experience and reducing power consumption of the videoconferencing system.

Figure 12:
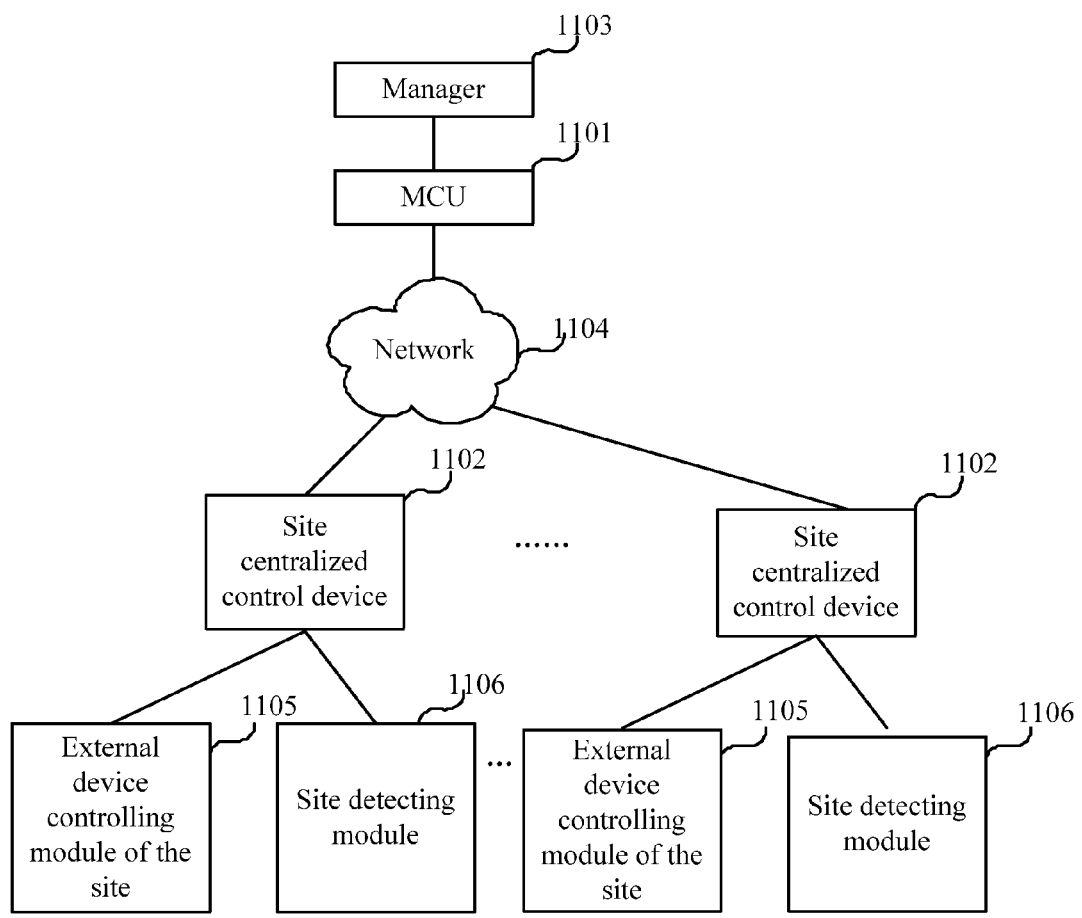
FIG. 12 is a schematic structural diagram of another embodiment of a videoconferencing system according to the present invention.

FIG. 12 is a schematic structural diagram of another embodiment of a videoconferencing system according to the present invention. Compared with the videoconferencing system illustrated in FIG. 11, the difference lies in that the videoconferencing system illustrated in FIG. 12 may further include: a management console 1103 configured to perform at least one of the following operations: conference definition, conference reservation, conference scheduling, and conference control, and send the foregoing conference reservation message to an MCU 1101 through a signaling channel. In this embodiment, the management console 1103 is a user management interface of the MCU 1101 and is connected to the MCU through a network. The management console 1103 may also be built in the MCU 1101.

A network 1104 is configured to implement communication between the site centralized control device 1102 and the MCU 1101, where the network may be an IP network, an E1 network, an ISDN, or a PSDN, and the like.

An external device controlling module 1105 of the site is configured to assist the site centralized control device 1102 in performing state transition control on all the external devices of the site controlled by the site centralized control device 1102. Specifically, the external device controlling module 1105 of the site may be implemented by using a relay.

In addition, the foregoing videoconferencing system may further include a site detecting module 1106. Specifically, after receiving a power-on command, the site centralized control device 1102 may enter a normal working state from a standby state only according to the power-on command; or the site centralized control device 1102 may determine, according to the power-on command in combination with site detection results detected by the site detecting module 1106 such as whether there are users who enter the site controlled by the site centralized control device and whether there are user operations at the site, whether to enter a normal working state from a standby state. That is, after receiving a power-on command, the site centralized control device 1102 may switch itself from the standby state to the normal working state according to the power-on command; or after the site centralized control device 1102 receives a power-on command, the site detecting module 1106 first detects whether there are users who enter the site controlled by the site centralized control device, and after the site detecting module 1106 detects that there are users who enter the site controlled by the site centralized control device, the site centralized control device 1102 switches itself from the standby state to the normal working state. Specifically, the site detecting module 1106 may perform detection by means of infrared, sound control, temperature control, and so on to get site detection results such as whether there are users at the site controlled by the site centralized control device 1102 or whether there are user operations at the site.

Similarly, after receiving a power-off command, the site centralized control device 1102 may perform, only according to the power-off command, power-off control on all the external devices of the site controlled by the site centralized control device 1102; may perform, according to the power-off command in combination with site inspection results detected by the site detecting module 1106 such as whether there are users at the site controlled by the site centralized control device or whether there are user operations at the site, power-off control on all the external devices of the site controlled by the site centralized control device 1102. That is, after receiving a power-off command, the site centralized control device 1102 may perform, according to the power-off command, power-off control on all the external devices of the site controlled by the site centralized control device 1102; or after the site centralized control device 1102 receives a power-off command, the site detecting module 1106 may first detect whether there are users at the site controlled by the site centralized control device 1102, and after the site detecting module 1106 detects that there are no users at the site controlled by the site centralized control device, the site centralized control device 1102 performs power-off control on all the external devices of the site controlled by the site centralized control device 1102. Specifically, the site detecting module 1106 may perform detection by means of infrared, sound control, temperature control, and so on to get site detection results such as whether there are users at the site controlled by the site centralized control device 1102 or whether there are user operations at the site.

The site detecting module 1106 may be integrated into the site centralized control device 1102, and may also be arranged independently. The implementation of the site detecting module 1106 is not limited by this embodiment. This embodiment is based on an assumption that the site detecting module 1106 is arranged independently.

In addition, this embodiment is based on an assumption that the site centralized control device 1102 is an independent control device.

The foregoing videoconferencing system may switch, through centralized control, in a non-conference state, devices in the videoconferencing system to a power-off state, and in a conference state, recover devices in the videoconferencing system to a normal working state, thereby improving user experience and reducing power consumption of the videoconferencing system.

Figure 13:
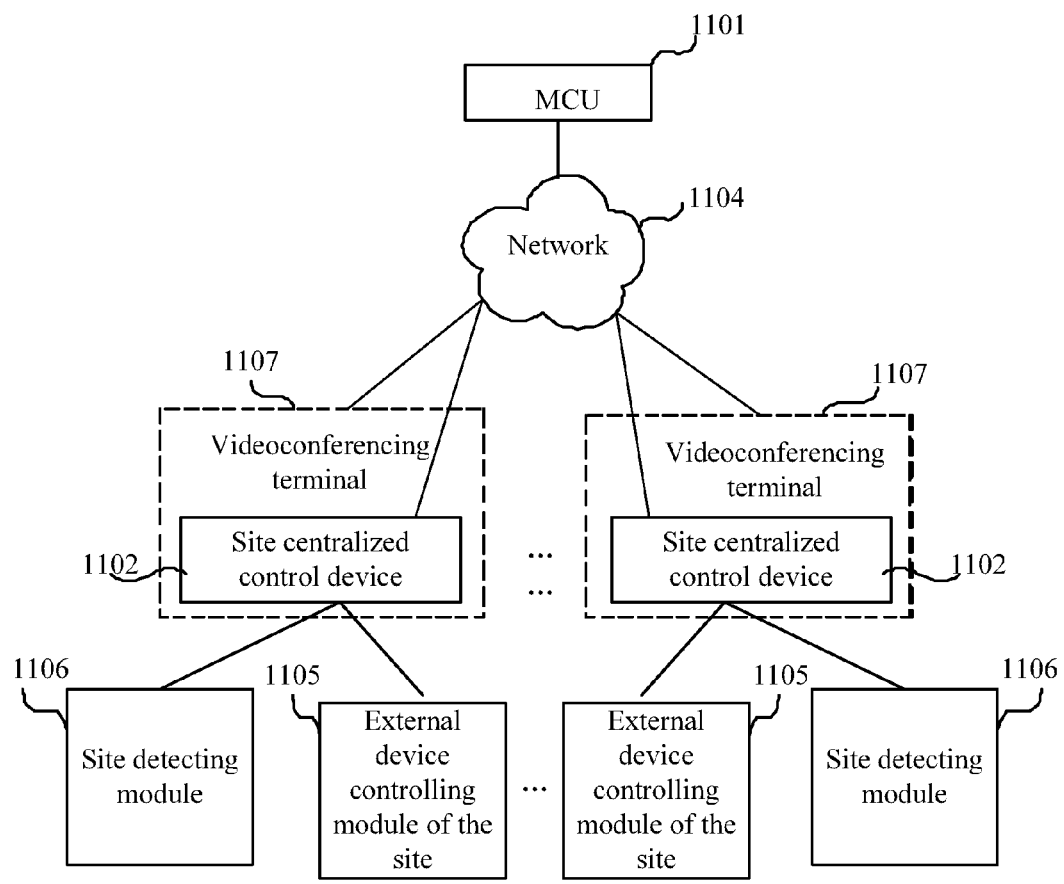
FIG. 13 is a schematic structural diagram of still another embodiment of a videoconferencing system according to the present invention.

FIG. 13 is a schematic structural diagram of still another embodiment of a videoconferencing system according to the present invention. The videoconferencing system provided in this embodiment is different from the videoconferencing system illustrated in FIG. 12 in that: this embodiment is based on an assumption that the site centralized control device 1102 is integrated into a videoconferencing terminal 1107 of the site controlled by the site centralized control device 1102. In addition, the videoconferencing system in this embodiment does not include the management console 1103.

The videoconferencing terminal 1107 is configured to send a conference reservation message to the MCU 1101 through the network 1104, where the videoconferencing terminal 1107 is connected to the MCU 1101 through the network. Specifically, the videoconferencing terminal 1107 performs conference reservation by using a remote controller or a Web, and then sends through the network 1104 a conference reservation message that includes start time and end time of a reserved conference and an identity of the site centralized control device at the site participating in the reserved conference to the MCU 1101.

The foregoing conferencing system may switch, through centralized control, in a non-conference state, devices in the videoconferencing system to a power-off state, and in a conference state, recover devices in the videoconferencing system to a normal working state, thereby improving user experience and reducing power consumption of the videoconferencing system.

It should be understood by persons skilled in the art that the accompanying drawings are merely schematic diagrams of an exemplary embodiment, and that modules or processes in the accompanying drawings are not necessarily required in implementing the present invention.

Persons skilled in the art may understand that the modules in the devices provided in the embodiments may be arranged in the devices in a distributed manner according to the description of the embodiments, or may be arranged in one or more devices which are different from those described in the embodiments. The modules according to the foregoing embodiments may be combined into one module, or split into multiple submodules.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of technical solutions of the embodiments of the present invention.

What is claimed is:

1. A state transition control method applied in a videoconferencing system, comprising:
    receiving, by a multipoint control server in the videoconferencing system, a conference reservation message, wherein the videoconferencing system comprises at least the multipoint control server, a site centralized control device at a site, and all external devices of the site controlled by the site centralized control device, wherein the site centralized control device is directly connected to all the external devices of the site controlled by the site centralized control device and the multipoint control server is connected to the site centralized control device through a network, wherein the conference reservation message carries start time and end time of a reserved conference and an identity of the site centralized control device at the site participating in the reserved conference; and
    sending, by the multipoint control server, a state transition command to the site centralized control device according to the start time of the reserved conference and the identity of the site centralized control device at the site participating in the reserved conference or according to the end time of the reserved conference and the identity of the site centralized control device at the site participating in the reserved conference such that the site centralized control device performs state transition control on all the external devices of the site controlled by the site centralized control device.

2. The method according to claim 1, wherein sending, by the multipoint control server, the state transition command to the site centralized control device according to the start time of the reserved conference and the identity of the site centralized control device at the site participating in the reserved conference or according to the end time of the reserved conference and the identity of the site centralized control device at the site participating in the reserved conference, such that the site centralized control device performs state transition control on all the external devices of the site controlled by the site centralized control device, comprises:
    sending, by the multipoint control server according to the start time of the reserved conference and the identity of the site centralized control device at the site participating in the reserved conference, a power-on command to the site centralized control device at the site participating in the reserved conference such that the site centralized control device performs power-on control on all the external devices of the site controlled by the site centralized control device.

3. The method according to claim 1, wherein after receiving, by the multipoint control server, the conference reservation message, the method further comprises entering, by the multipoint control server, a normal working state from a standby state before the start time of the reserved conference.

4. The method according to claim 1, wherein sending, by the multipoint control server, the state transition command to the site centralized control device according to the start time of the reserved conference and the identity of the site centralized control device at the site participating in the reserved conference or according to the end time of the reserved conference and the identity of the site centralized control device at the site participating in the reserved conference, such that the site centralized control device performs state transition control on all the external devices of the site controlled by the site centralized control device, comprises:
    sending, by the multipoint control server according to the end time of the reserved conference and the identity of the site centralized control device at the site participating in the reserved conference, a power-off command to the site centralized control device at the site participating in the reserved conference such that the site centralized control device performs power-off control on all the external devices of the site controlled by the site centralized control device.

5. The method according to claim 4, wherein after sending, by the multipoint control server according to the end time of the reserved conference and the identity of the site centralized control device at the site participating in the reserved conference, the power-off command to the site centralized control device at the site participating in the reserved conference, the method further comprises after all site centralized control devices at sites participating in the reserved conference enter a standby state, entering, by the multipoint control server, a standby state from a normal working state.

6. A state transition control method applied in a videoconferencing system, comprising:
    receiving, by a site centralized control device in the videoconferencing system, a power-on command from a multipoint control server, wherein the videoconferencing system comprises at least the multipoint control server, the site centralized control device at a site, and all external devices of the site controlled by the site centralized control device, wherein the site centralized control device is directly connected to all the external devices of the site controlled by the site centralized control device and the multipoint control server is connected to the site centralized control device through a network; and performing, by the site centralized control device according to a preset power-on sequence and a preset power-on time interval, power-on control on all the external devices of the site controlled by the site centralized control device such that all the external devices enter a working state.

7. A state transition control method applied in a videoconferencing system, comprising:

receiving, by a site centralized control device in the videoconferencing system, a power-off command from a multipoint control server, wherein the videoconferencing system comprises at least the multipoint control server, the site centralized control device at a site, and all external devices of the site controlled by the site centralized control device, wherein the site centralized control device is directly connected to all the external devices of the site controlled by the site centralized control device and the multipoint control server is connected to the site centralized control device through a network; and performing, by the site centralized control device according to a preset power-off sequence and a preset power-off time interval, power-off control on all the external devices of the site controlled by the site centralized control device.

8. The method according to claim 7, wherein after performing power-off control on all the external devices of the site controlled by the site centralized control device, the method further comprises after determining that all the external devices of the site controlled by the site centralized control device are powered off, entering, by the site centralized control device, a standby state from a normal working state.

9. A multipoint control server, comprising:

a first receiving module configured to receive a conference reservation message, wherein the conference reservation message carries start time and end time of a reserved conference and an identity of a site centralized control device at a site participating in the reserved conference; and a sending module configured to send a state transition command to the site centralized control device according to the start time of the reserved conference and the identity of the site centralized control device at the site participating in the reserved conference or according to the end time of the reserved conference and the identity of the site centralized control device at the site participating in the reserved conference such that the site centralized control device performs state transition control on all external devices of the site controlled by the site centralized control device.

10. The multipoint control server according to claim 9, wherein the sending module is specifically configured to:

send a power-on command to the site centralized control device at the participating site according to the start time of the reserved conference and the identity of the site centralized control device at the site participating in the reserved conference such that the site centralized control device performs power-on control on all the external devices of the site controlled by the site centralized control device.

11. The multipoint control server according to claim 9, wherein the sending module is specifically configured to:

send a power-off command to the site centralized control device at the participating site according to the end time of the reserved conference and the identity of the site centralized control device at the site participating in the reserved conference such that the site centralized control device performs power-off control on all the external devices of the site controlled by the site centralized control device.

12. The multipoint control server according to claim 9, further comprising a first state transition module configured to:

switch the multipoint control server from a standby state to a normal working state after the first receiving module receives the conference reservation message and before the start time of the reserved conference; and switch the multipoint control server from a normal working state to a standby state after all site centralized control devices at sites participating in the reserved conference enters a standby state.

13. A videoconferencing system, comprising:

a multipoint control server configured to receive a conference reservation message, wherein the conference reservation message carries start time and end time of a reserved conference and an identity of a site centralized control device at a site participating in the reserved conference, and send a state transition command to the site centralized control device according to the start time of the reserved conference and the identity of the site centralized control device at the site participating in the reserved conference or according to the end time of the reserved conference and the identity of the site centralized control device at the site participating in the reserved conference; and the site centralized control device configured to receive the state transition command from the multipoint control server, and perform, according to the state transition command, state transition control on all external devices of the site controlled by the site centralized control device.

* * * * *